(12) United States Patent
Schroder et al.

(10) Patent No.: US 10,884,113 B2
(45) Date of Patent: Jan. 5, 2021

(54) DIRECTION OF ARRIVAL ESTIMATION FOR AUTOMOTIVE SPREAD RADAR SYSTEMS

(71) Applicant: IEE INTERNATIONAL ELECTRONICS & ENGINEERING S.A., Echternach (LU)

(72) Inventors: Udo Schroder, Föhren (DE); Hans Peter Beise, Perl (DE); Thomas Stifter, Trier (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 0 days.

(21) Appl. No.: 16/466,187

(22) PCT Filed: Dec. 7, 2017

(86) PCT No.: PCT/EP2017/081867
§ 371 (c)(1),
(2) Date: Jun. 3, 2019

(87) PCT Pub. No.: WO2018/104468
PCT Pub. Date: Jun. 14, 2018

(65) Prior Publication Data
US 2020/0064455 A1 Feb. 27, 2020

(30) Foreign Application Priority Data

Dec. 8, 2016 (LU) .......................................... 93344
Mar. 2, 2017 (LU) ........................................ 100130

(51) Int. Cl.
*G01S 13/00* (2006.01)
*G01S 13/36* (2006.01)
(Continued)

(52) U.S. Cl.
CPC ............ *G01S 13/003* (2013.01); *G01S 13/36* (2013.01); *G01S 13/931* (2013.01); *G01S 2013/466* (2013.01); *G01S 2013/93271* (2020.01)

(58) Field of Classification Search
CPC .................. G01S 13/003; G01S 13/18; G01S 2013/93271; G01S 13/466; G01S 13/36; G01S 13/468; G01S 13/931
(Continued)

(56) References Cited

U.S. PATENT DOCUMENTS 3,919,707 A * 11/1975 Evans ..................... G01S 7/295
342/90
7,912,680 B2 3/2011 Shirakawa
(Continued)

FOREIGN PATENT DOCUMENTS

DE 102004017268 A1 11/2005
DE 102015110619 A1 1/2016
(Continued)

OTHER PUBLICATIONS

International Search Report corresponding to International application No. PCT/EP2017/081867, dated Feb. 27, 2018, 5 pages.
(Continued)

*Primary Examiner* — Erin F Heard
*Assistant Examiner* — Michael W Justice
(74) *Attorney, Agent, or Firm* — Reising Ethington P.C.

(57) ABSTRACT

A method of direction of arrival estimation with an automotive spread radar system. The automotive spread radar system includes a plurality of at least two transceiver antenna units, which are configured to work in a MIMO configuration, wherein the transceiver antenna units are arranged at a priori known positions. The automotive spread radar system is configured to determine, for each transceiver unit antenna unit of the plurality of transceiver antenna units, a range of a target reflecting radar waves that have been transmitted by at least the specific transceiver antenna unit by reading out a plurality of range gates assigned to a specific transceiver antenna unit. The method and radar
(Continued)

system are capable of estimating a direction of arrival without the need of ensuring a synchronization of antennas on the scale of a radar carrier frequency.

10 Claims, 8 Drawing Sheets

(51) Int. Cl.
  *G01S 13/931* (2020.01)
  *G01S 13/46* (2006.01)
(58) Field of Classification Search
  USPC .......................................................... 342/146
  See application file for complete search history.

(56) References Cited

U.S. PATENT DOCUMENTS

| | | |
|---|---|---|
| 8,994,581 B1 | 3/2015 | Brown |
| 9,599,702 B1* | 3/2017 | Bordes .................... G01S 13/18 |
| 2013/0314272 A1 | 11/2013 | Gross et al. |
| 2015/0070207 A1* | 3/2015 | Millar ................. G01S 13/4454 342/174 |
| 2015/0198704 A1 | 7/2015 | Schoor et al. |
| 2018/0074191 A1 | 3/2018 | Bilik et al. |

FOREIGN PATENT DOCUMENTS

| | | |
|---|---|---|
| EP | 2105758 A2 | 9/2009 |
| EP | 2667219 A1 | 11/2013 |

OTHER PUBLICATIONS

Written Opinion corresponding to International application No. PCT/EP2017/081867, dated Feb. 27, 2018, 7 pages.
Xiaoli Liu, "Joint Estimation of Angle and Doppler Frequency in MIMO Radar", Intellegent Control and Information Processing (ICICIP), accessed on https://ieeexplore.ieee.org/document/6568073, IEEE, dated Jun. 9, 2013, pp. 231-235.

* cited by examiner

DIRECTION OF ARRIVAL ESTIMATION FOR AUTOMOTIVE SPREAD RADAR SYSTEMS

TECHNICAL FIELD

The invention generally relates to a method of direction of arrival estimation with an automotive spread radar system, an automotive spread radar system configured for estimating a direction of arrival, and a software module for controlling automatic execution of the method.

BACKGROUND OF THE INVENTION

It is known in the art to employ radar technology, in particular in the millimeter wave range between 75 and 81 GHz, in exterior automotive applications such as driver assistance systems for providing improved safety by facilitating an optimized reaction of a driver of a vehicle with appropriate warnings or even by automatically taking over control of the vehicle, for instance in collision avoidance systems.

In automotive radar applications one challenge is to determine the Direction of Arrival (DoA) of incoming radar waves which were transmitted towards and were reflected by targets. Common realizations deal with large patch antennas and beamforming algorithms. However, future demands are directed towards multiple small antennas mounted spread over a vehicle for providing multi-functionalities (compare FIG. 1).

By way of example, patent application EP 2 105 758 A2 describes a direction of arrival estimation apparatus that has a signal vector generation unit operable to generate a signal vector v composed of N baseband signals $v_1$ to $v_N$ from arriving signals received from a target by N sensors. The direction of arrival estimation apparatus includes a Hankel matrix generation unit operable to preferentially set an order of a column of a matrix at a natural number M where $1 \leq M$ and $M \leq (N-1)/2$ and generate an $(N-M) \times M$ matrix $R_{f1}$, $R_{f2}$, $R_{b1}$, or $R_{b2}$ from elements $v_1$ to $v_{N-1}$ of the signal vector. The direction of arrival estimation apparatus also includes an estimation unit operable to generate a matrix R using the matrices $R_{f1}$, $R_{f2}$, $R_{b1}$, or $R_{b2}$, divide the matrix R into two submatrices $R_1$ and $R_2$ by $R=[R_1|R_2]^T$, and estimate a direction of arrival of the arriving signal based on the submatrices $R_1$ and $R_2$. In order to perform DoA estimation, use of phase information is required that is included in the submatrices $R_1$ and $R_2$.

U.S. Pat. No. 8,994,581 B1 describes a method of DoA estimation, in which a vehicle is configured with a radar system used to aid in vehicle guidance. The method could include an array of antennas formed by a plurality of antennas configured to receive a radar signal. The array of antennas has a respective spacing between the given antenna and an adjacent antenna; however, the plurality of spacings includes at least two different spacings. A portion of the method may be performed by a processor configured to calculate a detection channel, based on a difference between differential phases associated with two antenna pairs in the array. The processor may also calculate an unambiguous angle based on the detection channel and the plurality of antenna spacings. Additionally, the processor may control the radar unit based on the calculated unambiguous angle.

In order to use the described conventional DoA estimation methods it is therefore mandatory to ensure a synchronization of the antennas on the scale of the carrier frequency, which in case of an exemplary carrier frequency of 100 GHz means a synchronization on the scale of picoseconds ($10^{-12}$ s) or, for light, even on the scale of attoseconds ($10^{-18}$ s).

Further, a displacement of the antennas by multiple wavelengths leads to ambiguity in angular reconstruction when performed with conventional DBF.

SUMMARY

It is therefore desirable to provide a method and a radar system that is capable of estimating a direction of arrival without the need of ensuring a synchronization of antennas on the scale of a radar carrier frequency.

In one aspect of the present invention, this object may be achieved by a method of direction of arrival estimation with an automotive spread radar system. The automotive spread radar system comprises a plurality of at least two transceiver antenna units, which are configured to work in a multiple-input and multiple-output (MIMO) configuration. The transceiver antenna units are arranged at a priori known positions. The radar system is configured to determine, for each specific transceiver antenna unit of the plurality of transceiver antenna units, a range of a target reflecting radar waves that have been transmitted by at least the specific transceiver antenna unit by reading out a plurality of range gates that are assigned to the specific transceiver antenna unit.

The method comprises steps of
- for each specific one of the plurality of transceiver antenna units, determining a range of a target occurring in one of separated angular directions lying within an angular range that is arranged about a common direction at least from radar waves that have been transmitted by the specific transceiver antenna unit and have been reflected by the target, by reading out range gates out of the plurality of range gates of the specific transceiver antenna unit,
- determining a pattern of occupied range gates from the read-out range gates of the plurality of transceiver unit antenna units, and
- estimating a direction of arrival based on relating the determined pattern of occupied range gates to a plurality of expected patterns of occupied range gates for targets occurring in the separated angular directions, the plurality of expected patterns of occupied range gates being predetermined from the a priori known positions of the plurality of transceiver unit antenna units.

The proposed solution is an adaption of beamforming techniques to a larger baseline given by the locations of the plurality of transceiver antenna units. Each transceiver antenna unit has the possibility to separate the surrounding space coarsely but uniquely in angular regions of a size that depends on a size of the transceiver antenna unit. In that unique angular range, a displacement of the transceiver antenna units is utilized to refine an angular resolution based on a time-of-flight profile of the transceiver antenna units.

By that, a synchronization on the scale of the radar carrier frequency can beneficially be omitted in the proposed method of direction of arrival estimation. The method may thus utilize patterns of occupied range gates that are created by mutually shifted range gate allocations of the individual transceiver antenna units instead of a phase information of the incoming wave, as is the basis for conventional digital beamforming (DBF).

The method can be executed in a particularly simple manner for targets occurring in a far distance to the transceiver antenna units, i.e. in their "far field".

The term "automotive", as used in this application, shall particularly be understood to encompass an application for a vehicle such as, but not limited to, passenger cars, trucks and buses. The phrase "configured to", as used in this application, shall in particular be understood as being specifically programmed, laid out, furnished or arranged.

The range discrimination of the radar may be regulated by the so-called range gates.

This means that the received echo signal is sampled and the range information is decoded from the received signal in the different range gates by one of the different decoding techniques known in the field.

Preferably, a quantity of separated angular directions is equal to the quantity of transceiver antenna units in the plurality of transceiver antenna units. Also preferably, the separated angular directions are evenly spread within the angular range.

In preferred embodiments of the method, the step of determining, for each specific one of the plurality of transceiver antenna units, a range of a target includes determining a range of a target from radar waves that have been transmitted by the specific transceiver antenna unit and at least another one of the plurality of transceiver antenna units and have been reflected by the target, by reading out range gates out of the plurality of range gates of the specific transceiver antenna unit and of the at least one another transceiver antenna units. By receiving and decoding reflected radar waves that have been transmitted by another transceiver antenna unit, additional independent information can be obtained that can enable discriminating target configurations that would otherwise be ambiguous. It is emphasized that the additional independent information is solely range-based, and not phase-based.

Preferably, prior to the step of determining a range of the target occurring in one of separated angular directions, a step of merging consecutive range gates of each plurality of range gates into packages of a predetermined number of range gates is executed for all transceiver antenna units. By reducing resolution in range, a spatial regime of unambiguity of target detection can beneficially be enlarged.

In preferred embodiments of the method, the step of estimating a direction of arrival includes solving the linear equation system $$R_{\delta m} = A \cdot t$$

wherein t denotes a vector that represents occurring targets detected in the separated angular directions, $R_{\delta m}$ represents a vector comprising results from reading out the plurality of range gates. A is a matrix that is calculated from the a priori known positions and represents a linear mapping, by which vector t is transformed into vector $R_{\delta m}$.

In this way, the evaluation of data read out of the plurality of range gates based on relating the determined pattern of occupied range gates to a plurality of expected patterns of occupied range gates for targets occurring in the separated angular directions can be formalized and efficiently be executed by applying well-known methods of solving linear equations systems.

In another aspect of the invention, an automotive spread radar system for direction of arrival estimation is provided that comprises a plurality of at least two transceiver antenna units, which are configured to work in a multiple-input and multiple-output (MIMO) configuration, wherein the transceiver antenna units are arranged at a priori known positions. The automotive spread radar system further includes, for each specific transceiver antenna unit of the plurality of transceiver antenna units, a plurality of range gates that is configured to indicate a range of a target reflecting radar waves that have been transmitted by at least the specific transceiver antenna unit.

Furthermore, the automotive spread radar system comprises an evaluation and control unit. The evaluation and control unit is configured for reading out the plurality of range gates for all transceiver antenna units and for determining a pattern of occupied range gates from the read-out range gates of the plurality of transceiver unit antenna units. Moreover, the evaluation and control unit is configured for estimating a direction of arrival based on relating the determined pattern of occupied range gates to a plurality of expected patterns of occupied range gates for targets occurring in the separated angular directions, the plurality of expected patterns of occupied range gates being predetermined from the a priori known positions of the plurality of transceiver unit antenna units. The benefits described before in context with the method of direction of arrival estimation applied to the full extent.

In particular, in MIMO configurations each transceiver antenna unit is understood to be able to transmit radar waves in an independent manner that represent mutually orthogonal codes. Each transceiver antenna unit is further understood to be able to receive radar waves that have been transmitted by itself and any of the other transceiver antenna units and that have been reflected by an object without any cross talk disturbance. These embodiments provide the benefits of MIMO radar configurations regarding enlarged size of virtual aperture, improved spatial resolution and less sensitivity to interference signals, as is well known in the art.

The direction of arrival can be estimated in a particularly simple manner if the plurality of transceiver antenna units is arranged at the a priori known positions to form a one-dimensional linear array.

In preferred embodiments of the automotive spread radar system, the a priori known positions of the plurality of transceiver antenna units are arranged at a front region of a vehicle. In this way, the automotive spread radar system can beneficially be employed to provide information that can be used in driver assistance systems such as collision warning systems and lane change assistance systems.

Preferably, the evaluation and control unit comprises a processor unit and a non-transitory computer-readable medium (digital data memory unit) to which the processor unit has data access. In this way, the estimation of a direction of arrival can be performed within the automotive spread radar system to ensure a fast and undisturbed signal processing and evaluation.

Preferably, the automotive spread radar system comprises modulation means to operate the plurality of at least two transceiver antenna units in a phase-modulated continuous wave (PMCW) mode.

Using PMCW as a modulation technique, in particular for a MIMO radar system, can facilitate providing orthogonal waveforms to transmitting antennas of the transceiver antenna units by enabling the use of binary symbols.

In yet another aspect of the invention, a software module for controlling an automatic execution of steps of an embodiment of the method disclosed herein is provided.

The method steps to be conducted are converted into a program code of the software module, wherein the program code is implementable in a digital memory unit of the automotive spread radar system; that is, it is stored on the computer-readable medium and is executable by a processor unit of the automotive spread radar system. Preferably, the digital memory unit and/or processor unit may be a digital memory unit and/or a processing unit of the evaluation and control unit of the automotive spread radar system. The processor unit may, alternatively or supplementary, be another processor unit that is especially assigned to execute at least some of the method steps.

The software module can enable a robust and reliable execution of the method and can allow for a fast modification of method steps.

These and other aspects of the invention will be apparent from and elucidated with reference to the embodiments described hereinafter.

It should be pointed out that the features and measures detailed individually in the above-mentioned description can be combined with one another in any technically meaningful manner and show further embodiments of the invention. The description characterizes and specifies the invention in particular in connection with the figures.

BRIEF DESCRIPTION OF THE DRAWINGS

Further details and advantages of the present invention will be apparent from the following detailed description of not limiting embodiments with reference to the attached drawing, wherein.

DESCRIPTION OF THE ILLUSTRATED EMBODIMENTS

Figure 1:
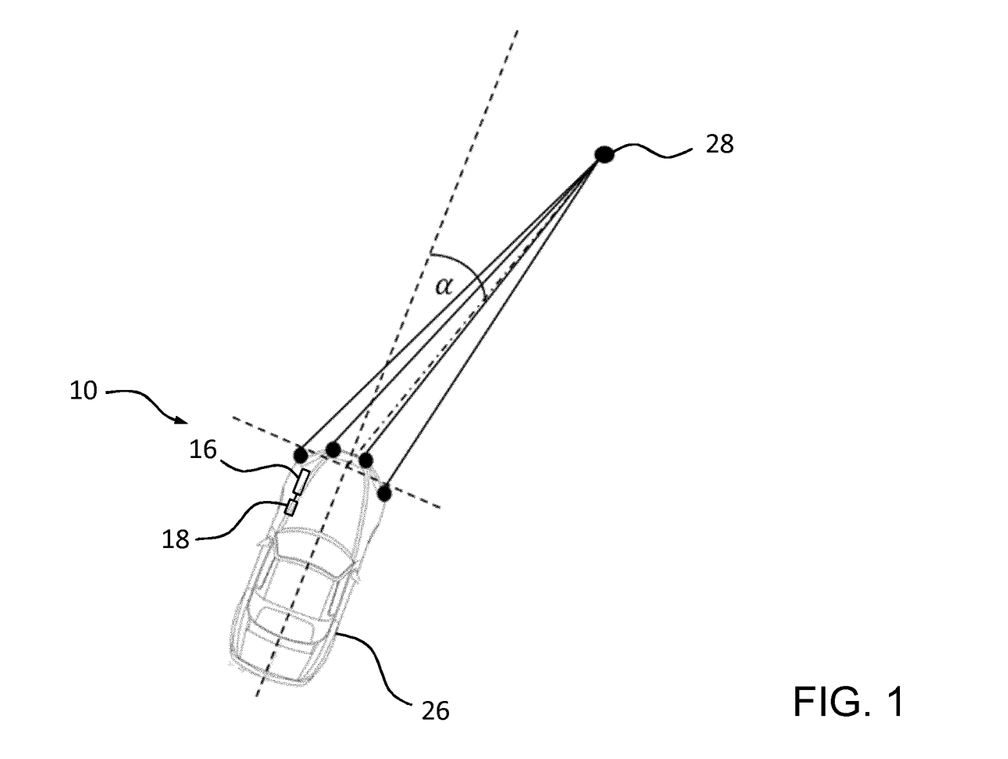
FIG. 1 illustrates a possible embodiment of the automotive spread radar system in accordance with the invention in a state of being installed in a vehicle, FIG. 2 schematically shows the plurality of transceiver antenna units of the automotive spread radar system pursuant to FIG. 1.

FIG. 1 shows a possible embodiment of an automotive spread radar system 10 for direction of arrival estimation of radar waves reflected by a target 28 in accordance with the invention. The automotive spread radar system 10 is installed in a vehicle 26 formed by a passenger car to provide information that is to be used as an input for a collision avoidance system of the vehicle 26. The automotive spread radar system 10 comprises a plurality of N=4 transceiver antenna units $TRx_k$, k=1–N, that are arranged at a priori known positions at a front region of the vehicle 26.

Figure 2:
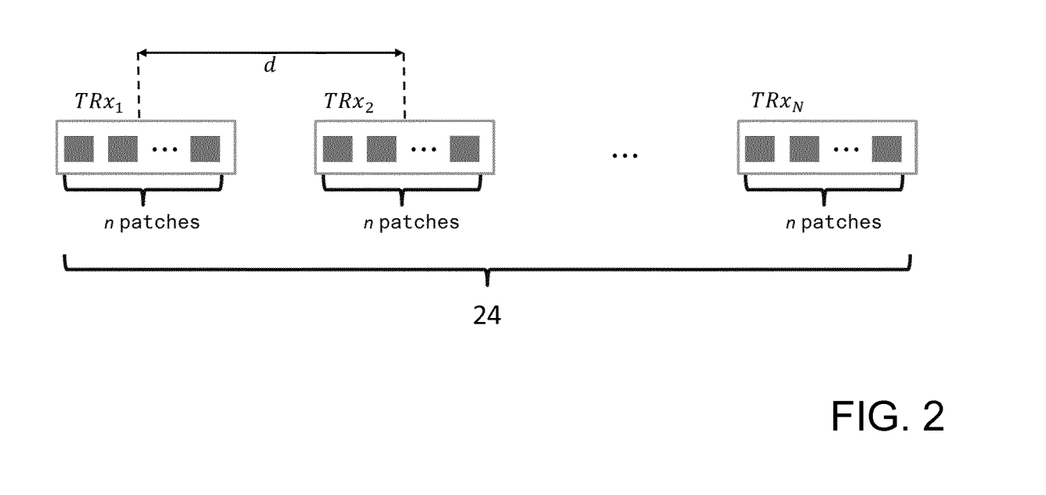

FIG. 2 schematically illustrates the plurality of N=4 transceiver antenna units $TRx_k$, k=1–N, of the automotive spread radar system 10 pursuant to FIG. 1. In FIG. 2, the transceiver antenna units $TRx_k$ are shown to be arranged at a priori known positions to form a one-dimensional linear array 24, wherein the transceiver antenna units $TRx_k$ are evenly spaced by a distance d, for example 0.5 m. For reasons of simplicity of the considerations to follow, this arrangement differs from the arrangement shown in FIG. 1. However, those skilled in the art will appreciate that similar geometrical considerations apply.

In this specific embodiment, the transceiver antenna units $TRx_k$ are identically designed. Each transceiver antenna unit $TRx_k$ includes a plurality of n=4 patches. In other embodiments, the number of patches may be different for some or for all of the transceiver antenna units $TRx_k$.

The plurality of transceiver antenna units $TRx_k$ is configured to work in a multiple-input and multiple-output (MIMO) configuration. The individual transceiver antenna units $TRx_k$ transmit orthogonal codes, i.e. each transceiver antenna unit $TRx_k$ can decode its own echo and the echoes generated by other transceiver antenna units $TRx_k$ without cross talk disturbances. To this end, the automotive spread radar system 10 comprises modulation means to operate the plurality of transceiver antenna units $TRx_k$ in a phase-modulated continuous wave (PMCW) mode.

Figure 3:
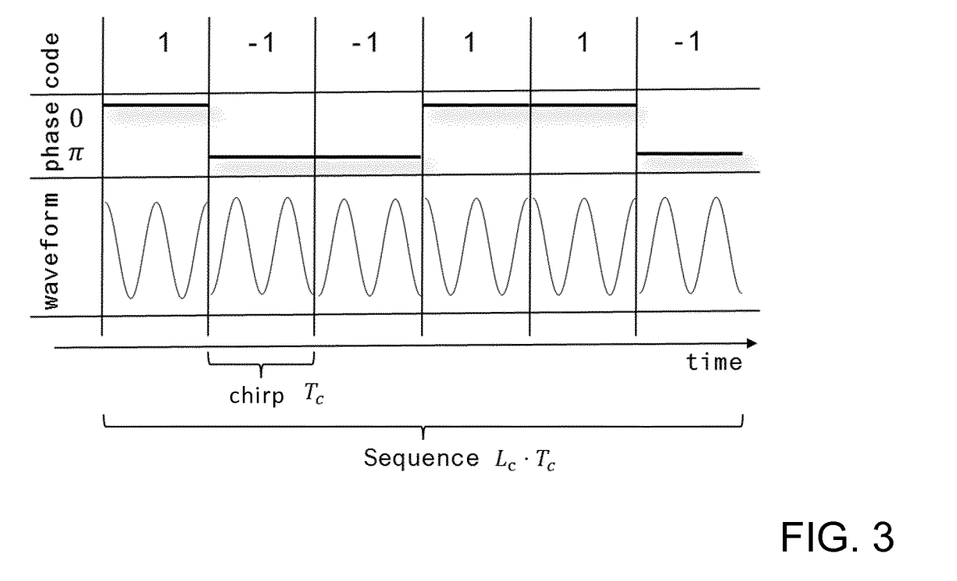
FIG. 3 shows a phase-modulated continuous wave for operating the transceiver antenna units pursuant to FIG. 2.

In this embodiment, PMCW is based on bi-phase modulation, which means $\varphi(t)=0°$ or $\varphi(t)=180°$ for an emitted signal $u(t)=A\cos(ft+\varphi(t))$. The phase code $c=(c_k)\in\{-1,1\}^{L_c}$, which is meant to be sent out could be properly chosen, for example as an Almost Perfect Auto-Correlation Sequence (APAS) or a Maximum Length-Sequence (m-sequence), depending on the requirements. The phase can then be modelled via $$\varphi_c(t) := \begin{cases} 0° & \text{if } c_{\lfloor \frac{t}{T_c} \rfloor \bmod L_c} = 1 \\ 180° & \text{if } c_{\lfloor \frac{t}{T_c} \rfloor \bmod L_c} = -1 \end{cases}$$

with chirp duration $T_c$ $T_c$ and code length $L_c$. A potential phase-modulated radar waveform is illustrated in FIG. 3.

For the PMCW automotive spread radar system 10 the MIMO concept can be realized via Hadamard coding to provide orthogonal signals. This per se known technique is called Outer Code MIMO Concept. For that purpose one has to take a matrix from the Walsh-Hadamard family (exists for all lengths multiple of 2 from 4 to 664) in which all rows are orthogonal. The length of needed outer code is equal to the number of transceiver antenna units $TRx_k$. For this specific embodiment with four transceiver antenna units $TRx_k$, one Hadamard matrix is given by $$H = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Figure 4:
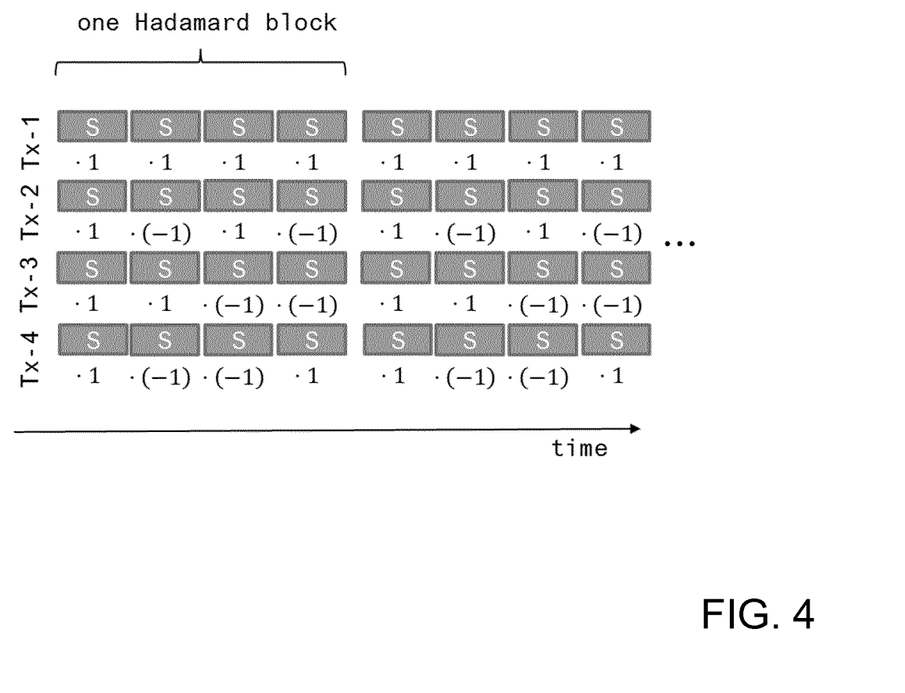
FIG. 4 shows a sequence to be transmitted by the transceiver antenna units, coded by a Hadamard matrix.

Then the sequence S, which is sent out will be coded (multiplied) by such Hadamard matrices as shown in FIG. 4.

For each specific transceiver antenna unit $TRx_k$ of the plurality of transceiver antenna units $TRx_k$, the automotive spread radar system 10 includes a plurality of range gates 12 that are configured to indicate a range of a target 28 reflecting radar waves that have been transmitted by the specific transceiver antenna unit $TRX_m$ as well as radar waves that have been transmitted by all other transceiver antenna unit $TRX_k$, k=1–N, k≠m, of the plurality of transceiver antenna unit $TRX_k$. The number of range gates is L.

The approach to obtain additional information for DoA is based on an allocation of the different range gates 12 of the transceiver antenna units $TRx_k$.

In the following, an embodiment of a method of direction of arrival estimation with an automotive spread radar system in accordance with the invention will be described.

Figure 5:
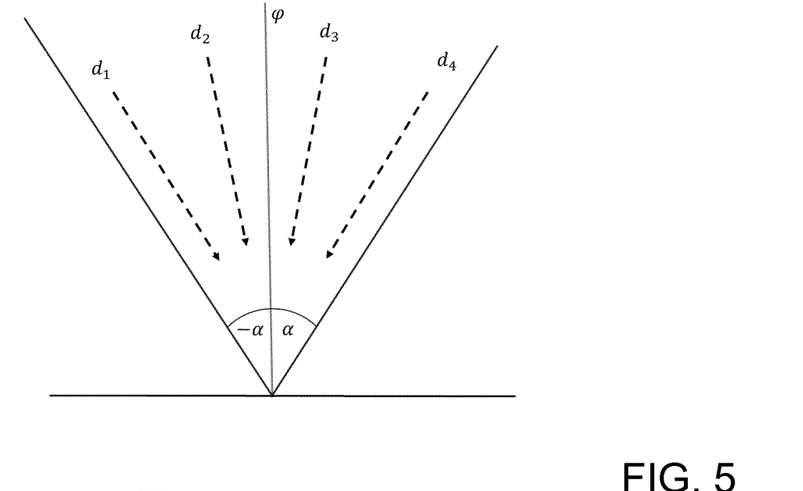
FIG. 5 illustrates separated directions of arrival arranged within an angular range of $\pm\alpha$ about a common angular direction $\varphi$.

Each of the transceiver antenna units $TRx_k$ determines a range of an occurring target 28 in one of separated angular directions of arrival $d_k$ lying within an angular range of $\pm\alpha$ that is arranged about a common direction $\varphi$ (uniqueness bin $\varphi\pm\alpha$). The separated angular directions of arrival $d_k$ correspond to angles $\alpha_k$ of value (FIG. 5):

$$\alpha_k = -\alpha + k \cdot \frac{2\alpha}{N+1} + \varphi, k = 1, \ldots, N$$

Figure 6:
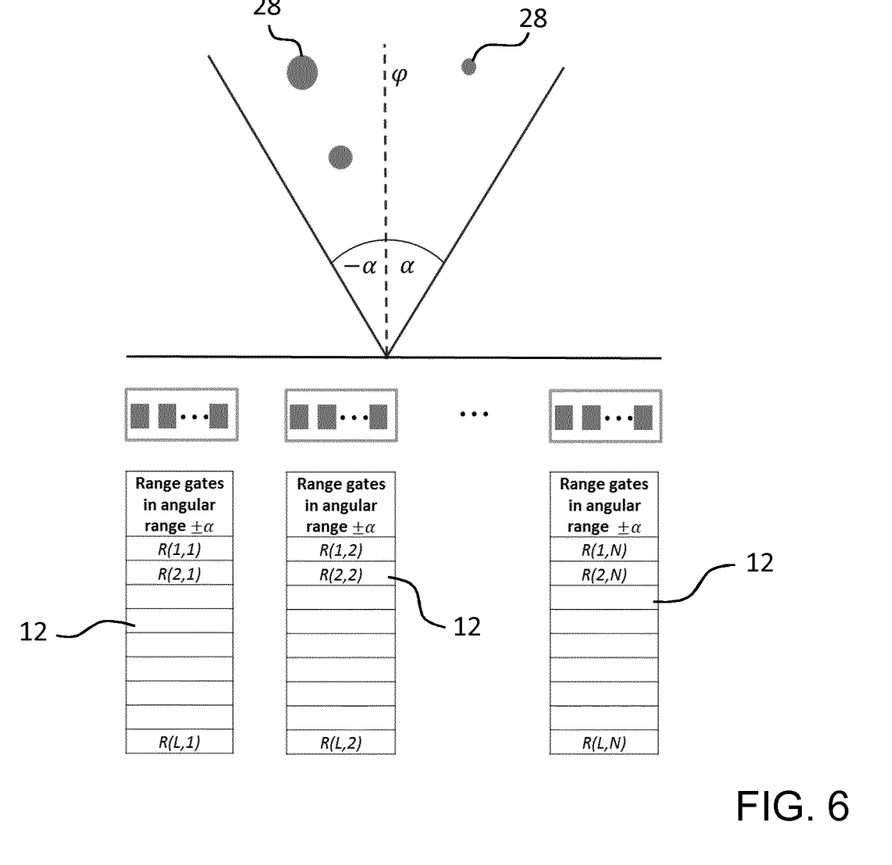
FIG. 6 shows an example of contents of the plurality range gates of the plurality of transceiver antenna units pursuant to FIG. 2 with targets occurring within the angular range $\varphi\pm\alpha$.

For each one of the plurality of transceiver antenna units $TRx_k$, the received signal is decoded in a first step for the received radar wave that has been transmitted by itself, and the plurality of range gates 12 is read out (FIG. 6).

Figure 7:
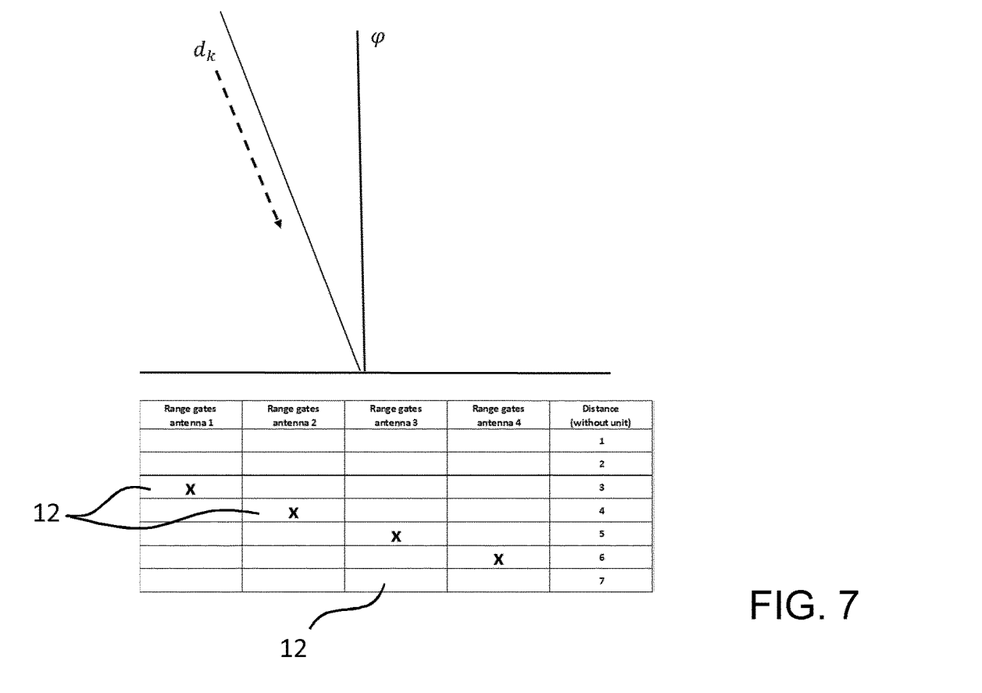
FIG. 7 illustrates a determined pattern of occupied range gates for a fixed direction of arrival.

For a fixed angular direction of arrival $d_k$ ad$_k$nd a fixed target 28 located in this angular direction of arrival $d_k$, the occupied range gates 12 of the individual transceiver antenna units $TRx_k$ are mutually shifted (FIG. 7):

Left side delay $\delta l_k$ (if $\alpha_k \leq \varphi$) in terms of range resolution units (denoted by r) of transceiver antenna units $TRx_j$ to $TRx_{j+1}$:

$$\delta l_k = -\frac{d\sin(\alpha_k)}{r} \text{ for } j = 1, \ldots, \frac{N}{2}$$

Right side delay $\delta r_k$ (if $\alpha_k \geq \varphi$) in terms of range resolution units r of transceiver antenna units $TRx_j$ to $TRx_{j+i}$:

$$\delta r_k = \frac{d\sin(\alpha_k)}{r} \text{ for } j = \frac{N}{2}+1, \ldots, N.$$

Thus, the maximum delay between adjacent transceiver antenna units $TRx_k$ is $$\delta m = \frac{-d\sin(\alpha_1)}{r} = \frac{d\sin(\alpha_N)}{r}$$

range gates 12.

In another step of the method, a pattern of occupied range gates 12 from the read-out range gates of the plurality of transceiver unit antenna units $TRx_k$ is determined. As illustrated in FIG. 7, the pattern shows as a mutual shifting of occupied range gates 12 among the plurality of transceiver unit antenna units $TRx_k$.

A direction of arrival $d_k$ is estimated based on relating the determined pattern of occupied range gates 12 to a plurality of expected patterns of occupied range gates 12 for targets occurring in the separated angular directions $\alpha_k$. The plurality of expected patterns of occupied range gates 12 has been predetermined from the a priori known positions of the plurality of transceiver unit antenna units $TRx_k$.

For obtaining unambiguity, prior to the step of determining a range of the occurring target 28, a step of merging consecutive range gates 12 of each plurality of range gates 12 into packages of a predetermined number of range gates 12 is executed for all transceiver antenna units $TRx_k$. The merging is illustrated in FIG. 8.

Figure 8:
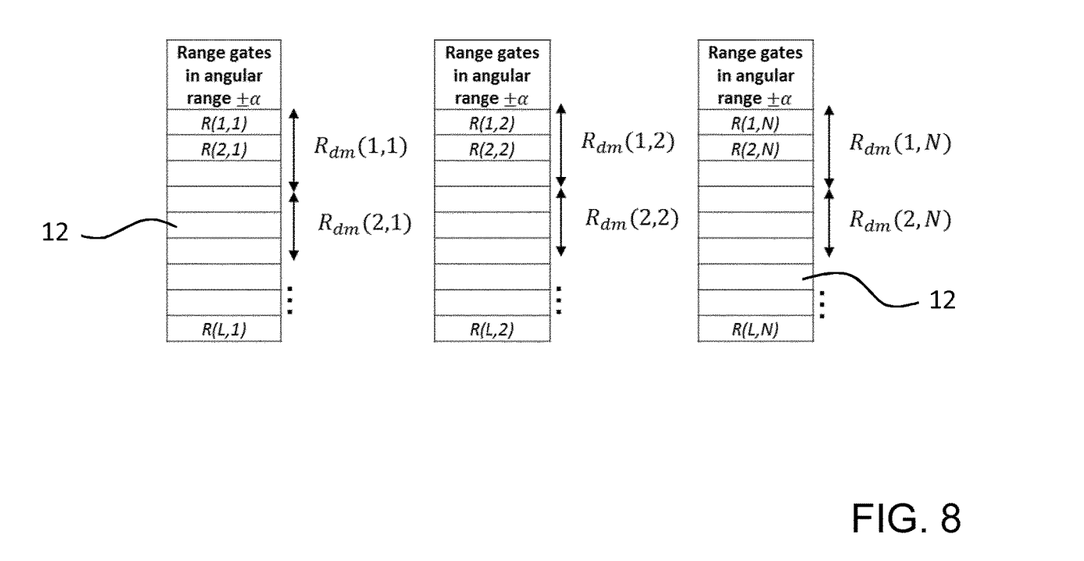
FIG. 8 shows the plurality of range gates of the plurality of transceiver antenna units after merging consecutive range gates of each plurality of range gates into packages of a predetermined number of range gates, FIG. 9 schematically illustrates a situation of determining the range of the occurring target in different ones of separated angular directions of arrival, FIG. 10 schematically shows the occurring target in relation to range cells of two transceiver antenna units, FIG. 11 schematically shows a situation of two transceiver antenna units detecting a two-target configuration, FIG. 12 schematically shows a discrimination of the two possible two-target configurations by range-based decoded information derived from cross talk between transceiver antenna units.

Then, for transceiver antenna unit $TRx_1$ a target 28 which is detected in angular direction corresponding to an angle $$\alpha_k, k \leq \frac{N}{2}$$

and a distance $d \in [j \cdot \delta m, (j+1) \cdot \delta m] =: R_{\delta m}(1,l)$, $j \in \{0, \ldots, \tilde{L}-N\}$ is detected as a target 28 in range $$\left\lfloor \frac{l-1}{k} \right\rfloor \cdot \delta m + [j \cdot \delta m, (j+1) \cdot \delta m] =: R_{\delta m}(j, l)$$

for the other transceiver antenna units $TRx_l$, l>1, as illustrated in FIG. 8.

Accordingly, the range gates 12 are occupied for targets 28 in the direction corresponding to angle $\alpha_k$, $$k > \frac{N}{2}.$$

The former range resolution decreases from r to $\sin(\alpha_1)$ d on the finer angular grid. The finer angle resolution requires additional computational effort of $\mathcal{O}(n(N\tilde{L})^2)$, wherein $\mathcal{O}$ denotes the Landau symbol.

An important observation can be made at this point: A higher angular resolution by transceiver antenna units $TRx_k$ will reduce the loss in range resolution in the refined angular grid, but at the same time will increase the computational costs.

For example, the considered PMCW automotive spread radar system 10 with parameters n=4, N=4, d=0.5 m, R=0.01 m, L=1000 will increase the separation in 16 angular directions (from 4 directions). The range resolution on the finer angular grid is reduced to 0.1 m and the finer angle resolution requires an additional computational effort of $\mathcal{O}(4 \cdot 400^2) = \mathcal{O}(640\,000)$ operations, which is in the range of standard processing.

The step of relating the determined pattern of occupied range gates 12 to a plurality of expected patterns of occupied range gates 12 for targets occurring in the separated angular directions $\alpha_k$ can formally be described as a linear mapping. The linear mapping takes place from the space of all possible target configurations to the resulting range gate occupations for the different transceiver antenna units $TRx_k$ and can be described by the following equation:

$$\begin{pmatrix} R_{\delta m}(1,1) \\ R_{\delta m}(1,2) \\ \vdots \\ R_{\delta m}(1,N) \\ \vdots \\ R_{\delta m}(\tilde{L},1) \\ R_{\delta m}(\tilde{L},2) \\ \vdots \\ R_{\delta m}(\tilde{L},N) \end{pmatrix} = A \cdot \begin{pmatrix} t(1,1) \\ t(1,2) \\ \vdots \\ t(1,N) \\ \vdots \\ t(\tilde{L},1) \\ t(\tilde{L},2) \\ \vdots \\ t(\tilde{L},N) \end{pmatrix} = A \cdot t$$

wherein t denotes a vector that represents occurring targets detected in the separated angular directions $\alpha_k$, and t(j, k) has a value of 1 if there is a target 28 occurring in angular direction $\alpha_k$ and distance in [j·δm, (j+1)·δm] from transceiver antenna unit $TRx_1$, and a value of 0 else. $R_{\delta m}$ represents a vector comprising results from reading out the plurality of range gates 12, and A is a matrix that is calculated from the a priori known positions and that represents a linear mapping, by which vector t is transformed to vector Ram. The step of estimating a direction of arrival $d_k$ is then carried out by solving the above linear equation system.

In many cases, the matrix A is a sparse matrix, i.e. the number of non-zero matrix elements is small compared to the total number of matrix elements, and the well-known methods of numerically solving linear equations systems with sparse matrices can beneficially be applied.

In general, the matrix A is not a square matrix. Well-known methods for solving linear equation systems represented by such matrices may be applied, such as compressed sensing, provided that known method-specific prerequisites are met.

Depending on actual parameters, for instance a range value, of a scenario of detecting a target and estimating a direction of arrival of radar waves reflected by the target, different matrices A may be employed for relating the determined pattern of occupied range gates 12 to a plurality of expected patterns of occupied range gates 12.

With reference to FIG. 1, the automotive spread radar system 10 comprises an evaluation and control unit 16 that is configured for reading out the plurality of range gates 12 for all transceiver antenna units $TRx_k$,
determining a pattern of occupied range gates 12 from the read-out range gates of the plurality of transceiver unit antenna units ($TRx_k$), and
estimating a direction of arrival $d_k$ based on relating the determined pattern of occupied range gates 12 to a plurality of expected patterns of occupied range gates 12 for targets occurring in the separated angular directions $\alpha_k$, the plurality of expected patterns of occupied range gates 12 being predetermined from the a priori known positions of the plurality of transceiver unit antenna units $TRx_k$.

In particular, the evaluation and control unit 16 is configured for relating the determined pattern of occupied range gates 12 to the plurality of expected patterns by solving the above-described linear equation system $R_{\delta m}=A\cdot t$.

The evaluation and control unit 16 can be located at any place within the vehicle 26 that appears suitable to those skilled in the art.

In order to be able to execute these steps, the evaluation and control unit 16 is equipped with a processor unit and a digital data memory unit to which the processor unit has data access, and a signal processing unit 18 (FIG. 14) whose function will be described later on. The digital data memory unit comprises a non-transitory computer-readable medium. Values of elements of matrix A reside in the digital data memory unit. The evaluation and control unit 16 is furnished with a software module. Method steps to be conducted are converted into a program code of the software module. The program code is implemented in the digital data memory unit of the evaluation and control unit and is executable by the processor unit of the evaluation and control unit.

In the cases of targets 28 occurring in the far field of the transceiver antenna units $TRx_k$ considered up to now, a range of the occurring target 28 is determined by each one of the plurality of transceiver antenna units $TRx_k$ in the same one of separated angular directions corresponding to angle $\alpha_k$ lying within the angular range $\varphi \pm \alpha$.

In case of targets 28 occurring in the near field of the transceiver antenna units $TRx_k$, a range of the occurring target 28 can be determined by each one of the plurality of transceiver antenna units $TRx_k$ in different ones of separated angular directions corresponding to angles $\alpha_k$ lying within the angular range $\varphi \pm \alpha$. The situation is illustrated in FIG. 9, for the sake of clarity only for two transceiver antenna units $TRx_1$, $TRx_2$.

Figure 9:
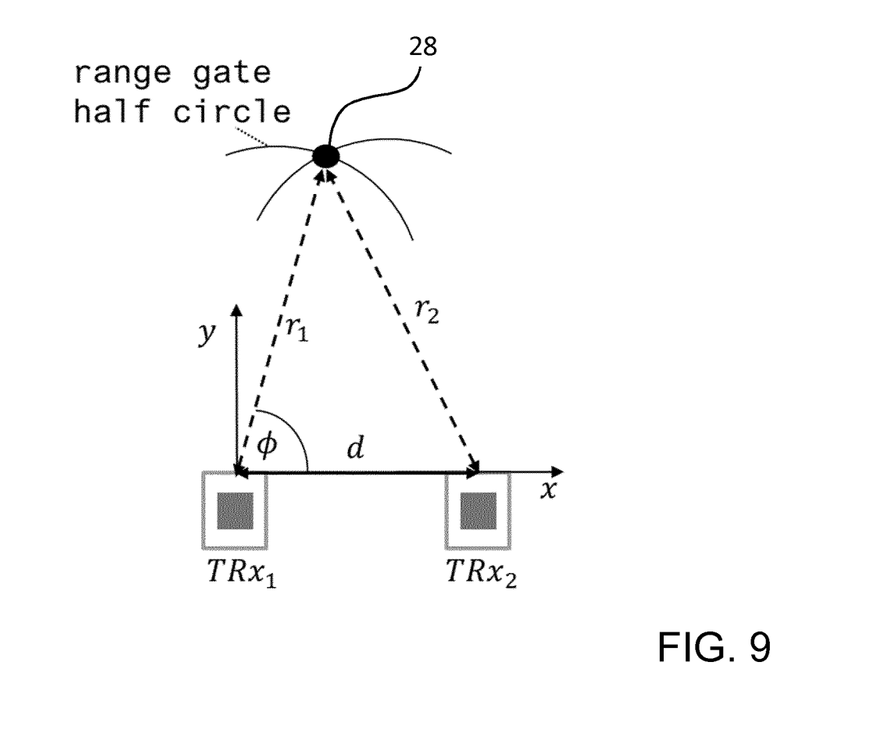

When at transceiver antenna units $TRx_1$ and $TRx_2$ range gate $2r_1$, and range gate $2r_2$ show a peak, respectively, then the target 28 is located at $$x = \cos(\phi)r_1, \; y = \sin(\phi)r_1 \text{ wherein } \phi = \arccos\left(\frac{-r_2^2 + r_1^2 + d^2}{2r_1 d}\right)$$

and coordinates are as shown in FIG. 9.

For these cases, the mapping matrix A has to be adjusted accordingly.

A target 28 located at $(x,y)=(\cos(\phi)r_1,\sin(\phi)r_1)$ will generate range gate peaks in $r_1=\sqrt{x^2+y^2}, r_2=\sqrt{(d-x)^2+y^2}$ at transceiver antenna units $TRx_1$, $TRx_2$, respectively.

Figure 10:
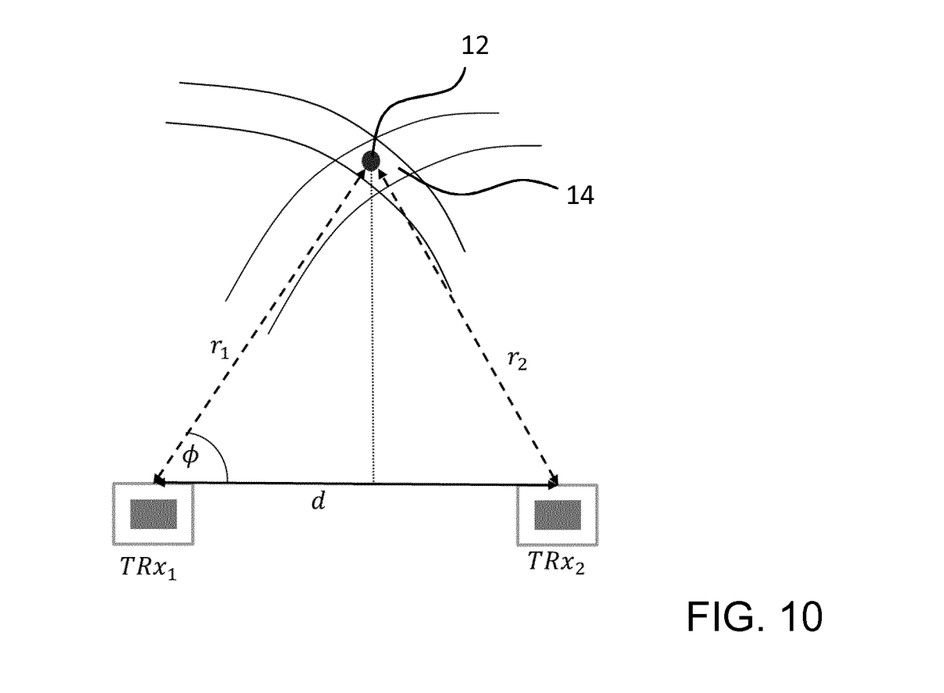

The number of cells 14 to decode is immediately linked with the coarseness of the grid (the size of the cells 14, compare FIG. 10). To reduce the complexity of the problem and achieve unambiguity one can increase the size of the cells 14 by merging range gates as described before. As in all angular decoding techniques, there is a trade-off between resolution and unambiguity which needs to be decided on.

Figure 11:
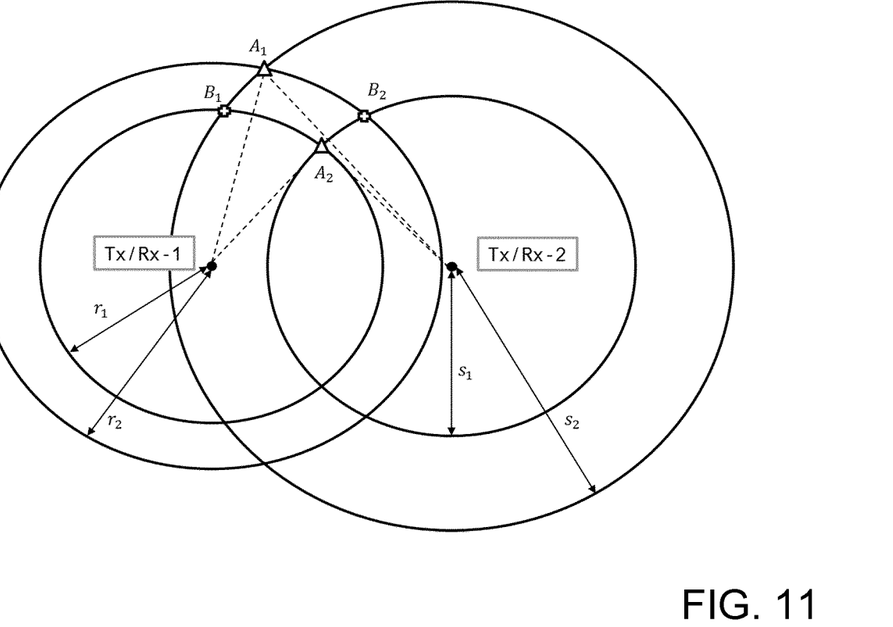

As presented before, an incoherent processing is unable to distinguish between target configurations like those illustrated in FIG. 11 (triangles $A_1$, $A_2$ versus crosses $B_1$, $B_2$). However, a coherent processing regarding range resolution yields uniqueness of the target configuration.

To achieve this, for each one of the plurality of transceiver antenna units $TRx_k$, a received signal from radar waves reflected by the targets is decoded not only for the received radar wave that has been transmitted by a specific transceiver antenna unit $TRx_m$, but also for the radar waves that have been transmitted by the balance of the plurality of transceiver antenna units $TRx_k$, k=1–N, k≠m, and the plurality of range gates 12 is read out.

Figure 13:
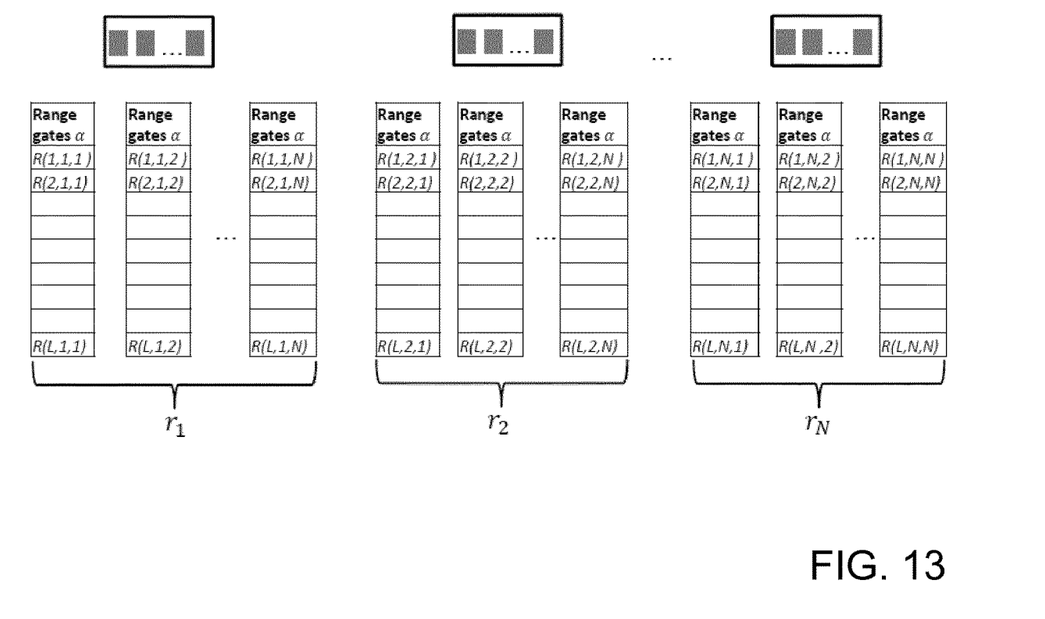
FIG. 13 illustrates a plurality of range gates of transceiver antenna units decoding their own radar signal as well as the radar signals transmitted by the other transceiver antenna units reflected by a target.

A plurality of range gates of the transceiver antenna units $TRx_k$ after decoding their own radar signal as well as the radar signals that have been transmitted by the other transceiver antenna units $TRX_k$, k=1–N, k≠m, and have been reflected by a target is illustrated in FIG. 13. Herein, an occupied range gate R(i,j,k) symbolizes a radar wave that has been transmitted by transceiver antenna units $TRx_k$, has been decoded by transceiver antenna units $TRx_j$, and has been received in a time slot corresponding to a distance of i times the range resolution r.

The range information one can get out of a complete MIMO concept is given in the table below.

|  | $A_1$ | $A_2$ | $B_1$ | $B_2$ |
|---|---|---|---|---|
| Tx1 to Rx1 | $2r_2$ | $2r_1$ | $2r_1$ | $2r_2$ |
| Tx1 to Rx2 | $r_2 + s_2$ | $r_1 + s_1$ | $r_1 + s_2$ | $r_2 + s_1$ |
| Tx2 to Rx1 | $s_2 + r_2$ | $s_1 + r_1$ | $s_2 + r_1$ | $s_1 + r_2$ |
| Tx2 to Rx2 | $2s_2$ | $2s_1$ | $2s_2$ | $2s_1$ |

The cross talks of the transceiver antenna units $TRx_k$ deliver further information (rows 2 and 3 of table), which can be used to discriminate the different target configurations. Again, it is emphasized that this information is solely range-based, and not phase-based.

Figure 12:
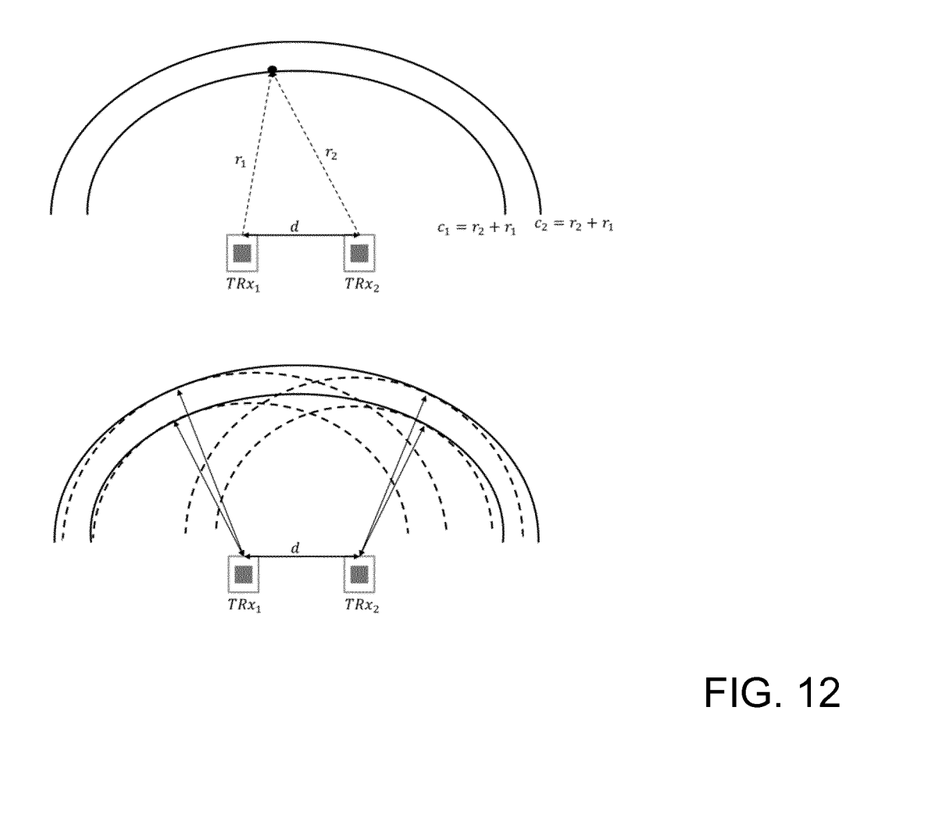

The additional information gained from decoding the mutual signals corresponds to distance separations by ellipses (here specified by constants $c_1$, $c_2$), as is illustrated in FIG. 12.

Signals received by the transceiver antenna units $TRx_k$ are processed by the signal processing unit 18 that forms part of the automotive spread radar system 10. The signal processing unit 18 is known per se and described herein for the sake of completeness.

Figure 14:
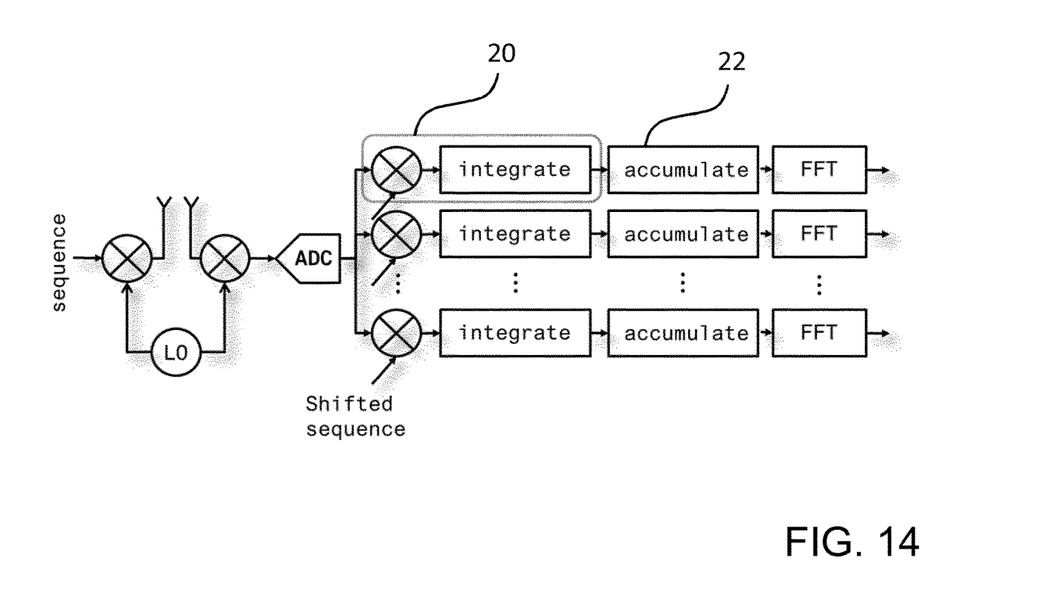
FIG. 14 is a schematic layout of a signal processing unit of the automotive spread radar system, and FIG. 15 schematically shows multiplication of a signal with each row of a Hadamard matrix after correlation.

The layout of the signal processing unit 18 is illustrated in FIG. 14. Correlators 20 will perform ranging, similar as in a global positioning system (GPS). The number of parallel correlators 20 is equal to sequence length $L_c$ to provide the range processing in one step. The coherent accumulator 22 will increase the signal-to-noise ratio (SNR) via M accumulations, and at least a Fast Fourier Transform (FFT) to extract the Doppler information will be performed.

Figure 15:
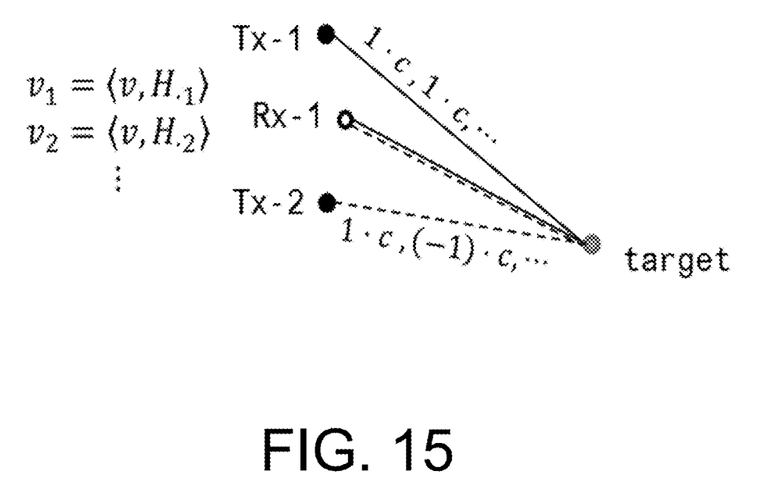

At the receiver side a multiplication of a signal v with each row of the Hadamard matrix $H_i$ is necessary to distinguish between each transmitter (after correlation, see for example, FIG. 15).

Design parameters of the automotive spread radar system 10 are:
Total Dwell time $$T_d = T_c \cdot L_c \cdot M \cdot N$$

Range resolution $$R_{res} = \frac{cT_c}{2}$$

Unambiguous range $$R_{max} = \frac{cL_c}{2R_c}$$

Velocity resolution $$v_{res} = \frac{\lambda_c}{2T_d}$$

with wavelength $\lambda_c$ of the carrier frequency

Processing gain $$G_{preFFT} = 10 \log_{10}(L_c M)$$

$$G_{FFT} = 10 \log_{10}(N)$$

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A method of direction of arrival estimation with an automotive spread radar system, the automotive spread radar system comprising a plurality of at least two transceiver antenna units, which are configured to work in a multiple-input and multiple-output configuration, wherein the transceiver antenna units are arranged at a priori known positions, and the automotive spread radar system is configured to determine, for each specific transceiver antenna unit of the plurality of transceiver antenna units, a range of a target reflecting radar waves that have been transmitted by at least the specific transceiver antenna unit by reading out a plurality of range gates that are assigned to the specific transceiver antenna unit, the method comprising steps of:

for each specific one of the plurality of transceiver antenna units, determining a range of a target occurring in one of separated angular directions lying within an angular range that is arranged about a common direction at least from radar waves that have been transmitted by the specific transceiver antenna unit and have been reflected by the target, by reading out range gates out of the plurality of range gates of the specific transceiver antenna unit, determining a pattern of occupied range gates from the read-out range gates of the plurality of transceiver antenna units, wherein the pattern of occupied range gates are created by mutually shifted range gate allocations of the plurality of transceiver antenna units, and estimating a direction of arrival based on relating the determined pattern of occupied range gates to a plurality of expected patterns of occupied range gates for targets occurring in the separated angular directions, the plurality of expected patterns of occupied range gates being predetermined from the a priori known positions of the plurality of transceiver antenna units, and wherein the direction of arrival is estimated without using phase information from reflected radar waves.

2. The method as claimed in claim 1, wherein the step of determining, for each specific one of the plurality of transceiver antenna units, a range of a target includes determining a range of a target from radar waves that have been transmitted by the specific transceiver antenna unit and at least another one of the plurality of transceiver antenna units and have been reflected by the target, by reading out range gates out of the plurality of range gates of the specific transceiver antenna unit and of the at least one another transceiver antenna units.

3. The method as claimed in claim 1, wherein prior to the step of determining a range of the target occurring in one of separated angular directions, a step of merging consecutive range gates of each plurality of range gates into packages of a predetermined number of range gates is executed for all transceiver antenna units.

4. The method as claimed in claim 1, wherein the step of estimating a direction of arrival includes solving the linear equation system $$R_{\delta m} = A \cdot t$$

wherein t denotes a vector that represents occurring targets detected in the separated angular directions, $R_{\delta m}$ represents a vector comprising results from reading out the plurality of range gates and A is a matrix that is calculated from the a priori known positions and the separated angular directions, wherein A represents a linear mapping, by which vector t is transformed into vector $R_{\delta m}$.

5. A non-transitory computer-readable medium for controlling automatic execution of steps of the method as claimed in claim 1, wherein the method steps are stored on the computer-readable medium as a program code, wherein the computer-readable medium comprises a part of the automotive spread radar system or a separate control unit and the program code is executable by a processor unit of the automotive spread radar system or a separate control unit.

6. An automotive spread radar system for direction of arrival estimation, comprising:
a plurality of at least two transceiver antenna units, which are configured to work in a multiple-input and multiple-output configuration, wherein the transceiver antenna units are arranged at a priori known positions,
for each specific transceiver antenna unit of the plurality of transceiver antenna units, a plurality of range gates that are configured to indicate a range of a target reflecting radar waves that have been transmitted by at least the specific transceiver antenna unit,
an evaluation and control unit that is configured to:
read out the plurality of range gates for all transceiver antenna units,
determine a pattern of occupied range gates from the read-out range gates of the plurality of transceiver antenna units, wherein the pattern of occupied range gates are created by mutually shifted range gate allocations of the plurality of transceiver antenna units, and
estimate a direction of arrival based on relating the determined pattern of occupied range gates to a plurality of expected patterns of occupied range gates for targets occurring in the separated angular directions, the plurality of expected patterns of occupied range gates being predetermined from the a priori known positions of the plurality of transceiver antenna units, and wherein the direction of arrival is estimated without using phase information from reflected radar waves.

7. The automotive spread radar system as claimed in claim 6, wherein the plurality of transceiver antenna units is arranged at the a priori known positions to form a one-dimensional linear array.

8. The automotive spread radar system as claimed in claim 6, wherein the a priori known positions of the plurality of transceiver antenna units are arranged at a front region of a vehicle.

9. The automotive spread radar system as claimed in claim 6, wherein the evaluation and control unit comprises a processor unit and a digital data memory unit to which the processor unit has data access.

10. The automotive spread radar system as claimed in claim 6, further comprising modulation means to operate the plurality of at least two transceiver antenna units in a phase-modulated continuous wave mode.

* * * * *